(12) United States Patent
Li et al.

(10) Patent No.: US 8,455,047 B2
(45) Date of Patent: Jun. 4, 2013

(54) METHOD FOR GROWING CARBON NANOTUBES ON CLAY PLATELETS

(75) Inventors: Yunjun Li, Austin, TX (US); James Novak, Austin, TX (US)

(73) Assignee: Applied Nanotech Holdings, Inc., Austin, TX (US)

( * ) Notice: Subject to any disclaimer, the term of this patent is extended or adjusted under 35 U.S.C. 154(b) by 1743 days.

(21) Appl. No.: 11/740,705

(22) Filed: Apr. 26, 2007

(65) Prior Publication Data

US 2012/0128878 A1    May 24, 2012

Related U.S. Application Data

(60) Provisional application No. 60/795,720, filed on Apr. 28, 2006.

(51) Int. Cl.
*B05D 7/00* (2006.01)
*C23C 16/26* (2006.01)

(52) U.S. Cl.
USPC .................. 427/215; 427/249.1; 977/842

(58) Field of Classification Search
None
See application file for complete search history.

(56) References Cited

U.S. PATENT DOCUMENTS

| | | | |
|---|---|---|---|
| 7,045,087 B2 | 5/2006 | Kotov | |
| 2004/0129570 A1 | 7/2004 | Talin et al. | |
| 2004/0134679 A1* | 7/2004 | Fomperie et al. | 174/100 |
| 2004/0185201 A1* | 9/2004 | Pinnavaia et al. | 428/36.1 |
| 2005/0181015 A1* | 8/2005 | Zhong | 424/426 |
| 2008/0087396 A1* | 4/2008 | Deng et al. | 162/175 |

OTHER PUBLICATIONS

Bakandritos, Chem. Mater., 2005, V17, p3468.*
Zhang, PNAS, Nov. 2005, V102, N45, p16141.*
Zhang, Adv. Mater., 2006, v18, p73.*
Zhang et al. Growth of Carbon Nanotubes on Clay: Unique Nanostructured Filler for High-Performance Polymer Nanocomposites. *Advanced Materials.* Jan. 2006. vol. 18, No. 1, p. 73-77; entire document, esp. p. 76, col. 2, para 3; p. 74, col. 2, para 1; p. 73, col. 2, para 1-3, p. 74, col. 1, para 1; Fig 2.
Zhang, Wei-De et al.; Growth of Carbon Nanotubes on Clay Unique Nanostructured Filler for High-Performance Polymer Nanocomposites; *Advanced Materials*; vol. 18, pp. 79-77, Nov. 15, 2005.
International Preliminary Report on Patentability received in corresponding PCT application No. PCT/US2007/067604 on Oct. 28, 2008, 6 pages.

* cited by examiner

*Primary Examiner* — Joseph Miller, Jr.
(74) *Attorney, Agent, or Firm* — Kelly Kordzik; Matheson Keys & Kordzik PLLC

(57) ABSTRACT

A hybrid carbon nanotube and clay nanofiller is produced by a freeze-drying process performed on clay platelets, and carbon nanotubes grown on the clay platelets using a chemical vapor deposition process.

21 Claims, 6 Drawing Sheets

METHOD FOR GROWING CARBON NANOTUBES ON CLAY PLATELETS

This application for patent claims priority to U.S. Provisional Patent Application Ser. No. 60/795,720, which is hereby incorporated by reference herein.

BACKGROUND

Since the discovery of carbon nanotubes (CNTs) (Ijima, S, Nature, 1991, 354, 56), their remarkable mechanical, electrical and thermal properties have been studied. Single-walled nanotubes (SWNTs) are perfect examples of a near one-dimensional, tubular macromolecule. This all carbon tube forms a continuous pi-electron structure with no edges or defects. The aromatic nature of the graphene surface contributes to all the molecular stabilization that gives CNTs their unique properties. In combination with their chemistry, their tubular structure gives them approximately 7 times the strength of steel with much less weight. These extraordinary mechanical properties have inspired continued interest in using CNT as filler additives in polymeric composites for obtaining ultra-light structural reinforcement with the potential for multi-functional applications.

Despite the promise of stronger and lighter composites, CNTs have not made the leap into mainstream manufacturing other than a few niche examples. One main reason for the lack of full production CNT-based composites is cost. This is typically not an issue when the ultimate strength is concerned. A more fundamental issue is the inherent problems with both dispersion and adhesion of the CNTs with the host resin. Improving the adhesion between the polymer matrix and CNT improves load transfer from the polymer to the nanotubes. This commutes stress points that can undermine the polymer by introduction of cracks that could propagate through the material. There are numerous examples of functionalizing the CNTs to promote adhesion in composite materials. However, there is still a lack of methods for proper dispersion that dominates the physical load transfers.

Carbon nanotubes have $sp^2$ carbon-carbon double bonds oriented along the tube axis. These $sp^2$ pi-bonds create an extended network of overlapping electron density creating the excellent electrical and thermal conductivity characteristics of carbon nanotubes. Likewise, this bond structure produces a very strong material with extremely high strength to weight ratio. The drawback to this structure is the extended pi-bond structure causes the nanotubes to have a very high affinity for other nanotubes. This causes them to stick together in ropes or bundles. The Van der Waals forces that hold them together are very strong and make it difficult to separate the CNTs. These ropes or bundles present problems for ultimate strength in a host matrix. Nanotubes can easily slip along their longitudinal axis. The ability to slide against each other creates noticeable defects in a composite structure. It is imperative to have highly dispersed individual CNTs when maximum strength is required. There are several methods to disperse CNTs into a host matrix such as a polymer resin. Most of these methods are based upon chemical functionalization.

The pi-bonds on CNTs provide surface reaction sites to derivatize the nanotubes. Taking advantage of well known organic chemistry reactions involving alkenes or aromatic compounds, chemical end groups can be covalently bonded to the surface to engineer the CNT for a particular application. For example, to increase solubility in a polar solvent one could add an acid or hydroxyl terminated end groups. The type and degree of functionalization can be used to provide exfoliation of the CNT bundles and increased interaction with the host matrix. When attached to the side walls of the CNTs, the functional groups provide a charged surface that prevents the CNTs from sticking together, thus providing stability in solution. Functional groups can also be used to increase the interaction of the CNT in a host matrix, for example is structural resin. However, this functionalization comes at a price. Increasing the degree of functionalization will disturb the extended □-structure that gives the CNTs their fantastic properties. In short, covalently attaching side groups weakens the structural properties of CNTs. There have even been calculations that indicate that non-functionalized CNTs have a higher Young's modulus compared with functionalized CNTs when inserted into a polyethylene composite. (Odegard, G. M. et al., AIAA Journal, 2005, (43) 1828).

To maximize the physical characteristics of CNTs in a matrix, the CNTs must exist as individual tubes. The most common method for deaggregation of CNTs is ultrasonication of a CNT solution. (J. Sandler, et al. Polymer, (1999) 40, 5967). Starting with powdered forms of CNTs suspended in a solvent, high enemy sonic waves vibrate the tubes with enough energy to separate from bundles to individual tubes. Without some method of stabilization, the tubes will reagglomerate as soon as the sonication (energy input) is stopped. There needs to be some energy barrier to prevent the CNTs from reagglomerating. The best method for physical separation typically involves sonication of the CNTs in solution with a stabilizing agent such as a polymer or surfactant. The sonic energy serves to deagglomerate the CNTs while the stabilizing agent adheres to the surface preventing them from sticking back together. They further provide a steric barrier for agglomeration. These methods will not work for high strength composites since the stabilizing agents typically become impurities producing defect sites in the high-strength resin. Electric field manipulation, ball-milling and polymer wrapping are other physical techniques that have been proposed by a few researchers for breaking up the agglomerates. These typically do not provide enough energy to overcome the Van der Waals forces that hold the tubes together. This leads us to chemical techniques for dispersion.

Chemically functionalized CNTs are more efficient as reinforcing agents in polymers than pristine CNTs because functionalized nanotubes typically are more stable and have a more uniform dispersion in organic solvents. The secondary effect is that these functional groups attached to the surface of the CNT can be designed to establish covalent linkages with the polymer matrix during a cross-linking process. Under such scheme, load transfer from matrix to CNT under an external force is significantly increased from the increased dispersion and the chemical functionalization resulting in improved properties. Chemical bonding can make the CNTs a structural part of the polymer matrix rather than just a mixed in additive.

Oxidation through acidification is one of the widely used functionalization procedures. Oxygen-containing functional groups including hydroxyls, carbonyls, esters, ethers and importantly carboxylic acids have been identified in oxidized CNTs. These groups are commonly attached through an acidic purification step during synthesis of the carbon nanotubes. Placement of these groups is on the ends of the CNTs and to a lesser degree the side-walls. When attached to the sidewalls these oxygen-containing groups remarkably improve the exfoliation and interfacial bonding in a polymer matrix. The drawback of this approach is that the oxidation brings serious damage to the sidewall and even disrupts the and structure. These damaged defect sites reduce strength in the CNTs and a resulting polymer matrix. Solvent-free chemical oxidation techniques proposed at Rice University (Tour et al., *Journal of Physical Chemistry A*, 2004, 108, 51) successfully improved the solubility of CNTs in organic solution but severely damaged the sidewalls of the tubes. This prevents their use in structural composites. Each time a functional group is placed on the sidewall of is CNT it increases its solubility or stability in as matrix while drastically reducing its physical strength. There are no chemical techniques available for covalently modifying the CNTs without disrupting its chemical, electrical and structural integrity.

Functionalized CNTs are mainly based on the carboxylic acid groups formed by oxidation of CNTs using strong acids (J. Chen, et al *Science* 1998, 282; 95; W. Zhao, et al. *J. Am. Chem Soc.*, 2002, 124, 124, 12418). These acid purification steps oxidize the sidewalls of the CNTs at defect sites. This highly-aggressive oxidation typically shortens the CNTs from several microns down between 0.1 to 1 µm. This is a disadvantage. Short CNTs are less useful for applications based on their length or aspect ratio. For example, long length is advantageous in an epoxy type system where the starting products are monomeric. The longer CNTs have an increased ability to transfer load to more entanglements.

DETAILED DESCRIPTION

Figure 1:
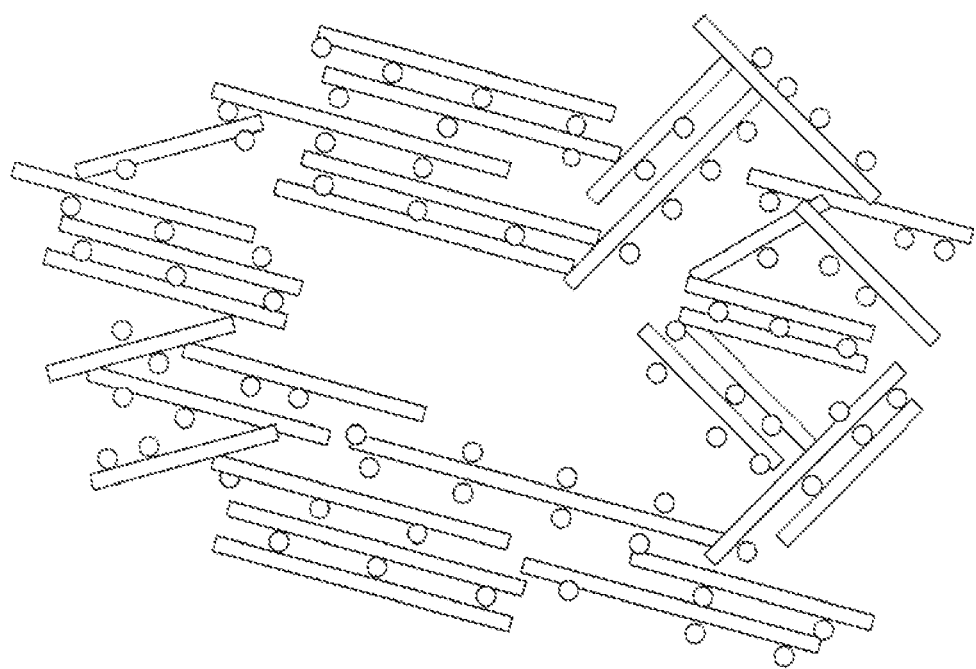
FIG. 1 illustrates delaminated clay by freeze-drying, which possesses catalytically active structures containing micropores formed by the random orientation of platelet aggregates.

Due to their inherent structural properties, a use of carbon nanotubes is as a filler material to increase the strength of composites. Neat, pristine carbon nanotubes do not disperse well in any host matrix without some help. Chemical functionalization of CNTs helps with dispersion but reduces the structural advantage of using CNTs. For example, Applied Nanotech, Inc. of Austin, Tex. is developing nylon-CNT, nylon-clay nanocomposites and epoxy nanocomposites with CNT and clay additives. For nylon nanocomposites, well dispersed clay-enhanced composites have improved tensile strength compared with CNTs. This is due, in part, to the shortened and structurally damaged CNTs created during acid-oxidization process by acids. The main reason is not that carbon nanotube-enhanced composites are not stronger than clay. It is that the clay is easily functionalized without damage. Although, an 10~18% improvement in flexural strength has been achieved for CNT-epoxy composites (K. I. Winey, et al. *Polymer*, 2006, 47, 293), But, this result is still not better than clay-epoxy nanocomposites that show it 30% improvement (*Composites Sci. and Tech.*, 2005, 65, 307; *Polymer*, 2003, 44, 7449; *Materials Science Forum*, 2006, Vol 505-507, 37). This leads to the question of whether superior dispersion or chemical functionalization yields the best structural resin additive. Recently, Zhang et al. have shown that CNTs can be grown by chemical vapor deposition between clay platelets following the intercalation of ion oxide particles between the platelets by traditional air-drying process. Enhanced mechanical properties of nylon composites prepared by melt-compounding with clay-CNT nanofiller have been obtained. Entangled carbon nanotubes and aggregated CNTs, however, are grown on clay particles, making it difficult to produce well-dispersed or exfoliated nanocomposites or even create defects in nanocomposites. On the other hand, the air-drying of $Fe^{3+}$-clay results in face-to-face well-ordered clay platelets so that carbon nanotubes can only grow from the surface of clay clusters or edges of clay platelets and is difficult to delaminate clay platelets during CNT growth.

Embodiments of the present invention attach the individually distributed CNTs directly to the clay nano-platelets to make a hybrid nanofiller. There are several advantages to using carbon nanotubes on clay. First, the clay is an excellent dispersant and additive for polymer composites by itself. Second, clays help exfoliate the carbon nanotubes and conversely, CNTs help exfoliate the layers of clay. Third, CNTs and nanoclays each contribute separately to enhance different aspects of mechanical strength. In addition, carbon nanotubes adhere very strongly to the clay surface. They have a large area overlap with the clay surface and strong Van der Waals forces which hold them in place. Lastly, clays are significantly cheaper than carbon nanotubes. Current prices range around $7/pound for clays to nearly $27,000/pound for unpurified single wall CNTs. The combination of a pseudo-one dimensional structure (CNTs) and a quasi-two-dimensional (2D) structure (nanoclays) makes an excellent nano-filler for high strength polymer structures. The polymer chains will be entangled and wrapped around the pseudo-two-dimension nano-filler. The interaction of polymer chains with hybrid nano-filler is much stronger than that with the smooth CNTs alone or clay platelets alone. Furthermore, due to the ease of clay functionalization compared with CNTs, there will be many possibilities to further develop the nano-filler to produce even stronger interaction to matrix polymer chains.

It is not possible to chemically functionalize the sidewalls of SWNTs without distorting their mechanical properties. The outer graphitic structure of the CNT wall is chemically stable due to the extended network of overlapping pi-bonds. If some of the double buds that make up the graphitic structure are removed, the aromaticity and all the stability associated with it are removed. This includes stability induced electronic properties and mechanical properties. Each time an external covalent bond is added to the side-wall of the CNT, the delocalization of electrons in three 6-member carbon rings are compromised. This new covalent bond is now a defect site in the structure and there is no longer an extended pi-structure in the bonding orbitals at this site. Considering that a 2 nm diameter SWNT has approximately twenty-six 6-membered (phenyl) carbon rings making up the circumference each covalently bonded side groups changes 12% of the bonding structure. This is a large contribution to a decrease in the overall strength of the SWNT. Each of these new defect sites are now a point of concern for the formerly stiff, strong cylinder. It is like putting a kink in a drinking straw that creates a buckling point. The strength is compromised as a new point of bending/buckling is created and the result is the overall decrease in strength of the nanoadditive and the resulting composite. Instead of starting with mass produced, bundled SWNTs, growing highly dispersed nanotubes on clay can lead to directly well-dispersed CNTs and clay in a polymer matrix as it when blended with polymer matrices without any further functionalizing step.

Like carbon nanotubes, nano-clays are excellent additions for high-performance composites. However, like the CNTs, they also have limitations. Montmorillonite (MMT) clays can be used to prepare clay-supporting catalyst for growing carbon nanotubes. Montmorillonite clay minerals are mined in various parts of the world. The montmorillonite minerals are composed of hydrous alumino silicates with extremely small particle size. Sodium montmorillonite is prepared by ion exchange from a calcium-sodium MMT by sedimentation, centrifugation, drying, and finally exchanging with sodium carbonate, Na$^+$ MMT, manufactured at Southern Clay Products, may be used.

Nano-clays have a flat, 2-D structure made up of an extended network of alumino-silicate crystals. This creates an ionic surface which self-assembles into a layered structure with each layer separated and charge balanced by sodium atoms. A clay particle consists of clusters of platelets. A single platelet is 1 nm thick and 50-1000 nm laterally. The clay has a similar structure to carbon nanotubes with the extended surface structure. A major difference is that they are not completely hollow and they are not cylindrical. The flat structure allows an increase in surface area compared to CNTs. This increase in surface area creates more bonding sites that enhance the interface between the clay and composite resin. Also, the chemical functionalization of the surface of the clays can be easily tuned for strong interaction with the desired composite resin. For example, the replacement of inorganic exchange cations by organic; alkyl ammonium ions on the gallery surfaces of smectic clays helps to match the polarity of clay surface with the polarity of the polymer matrix while simultaneously expanding the clay galleries (Ogawa et al., *Bulletin of Chemical Society of Japan*, 1997, 70, 2593; Okada et al., *Materials science and Engineering C*, 1995, 3, 109). This increase in gallery spacing facilitates the penetration by the polymer increasing the load transfer abilities of the clay. In general, the longer the surfactant chain length of the ammonium ion and the higher the charge density of these ions within the clay, the larger the clay gallery spacing. Pinnavaia et at (Pinnavaia et al., *Chemistry of Materials*, 1995, 7, 2144; Pinnavaia et al., *Chemistry of Materials*, 1994, 6, 2219) have inserted epoxied terminated chains between clay platelets modified with alkyl ammonium ions. This chemical modification helps form epoxy-nanoclay composites of superior mechanical properties.

Clays are capable of increasing the flexural modulus and flexural strength of composites. The flat structure helps interlayer bonding and prevents separation. This is one area that CNTs cannot contribute due to their cylindrical geometry.

it is known that the platelets of clay can be separated by intercalating cations. These types of modified clay are referred to as pillared clays. The intercalated cations allow them to prop apart the platelets of clay and expose the surface of clay for catalytic reaction. The pillared clay is typically prepared by reacting clay with polyoxymetal cations in solvent for ion exchanging (See U.S. Pat. No. 4,176,090 which is hereby incorporated by reference herein). The reaction product is normally dried in air to remove the solvent in between the clay platelets and keep the layered clay structure with an increase gap between clay platelets. During drying, the clay platelets tend to attract each other by ionic interaction to form well-ordered clay particles containing face-to-face oriented platelets. For the air-dried clay, well-ordered stacking of platelets can be directly observed by TEM and XRD diffraction pattern contains distinct first order reflection (Science, 220, 365-371 (1953)). The dried clay is then calcined to convert the intercalated cations into metal oxides clusters interposed, between platelets of clay. The spacing between the platelets controlling by the size of metal oxides, which can be expanded to a value as large as 6.3 nm, is thermally stable up to 800° C. (Y. S. Han, et al. Chem. Mater., 9, 2013 (1997)). FIG. 1 shows a delaminated clay, in addition to some oriented face-to-face platelets, also has many oriented with face-to-edge and edge-to-edge platelets (U.S. Pat. No. 4,761,391), thereby generating a "house-of-cards" structure containing macropores of a size typically found in amorphous clay in addition to micropores found in pillared clays. This porous structure from freeze-dried clay has desirable catalytic properties for growing homogeneous carbon nanotubes on clay platelets.

Freeze-drying employs sublimation. Sublimation is the process of converting $H_2O$ in its solid state (ice) directly to its gaseous state (vapor), bypassing the intermediate liquid state (water). In a gel or slurry, clay platelets may be discretely distributed or delaminated. The water may be removed by freezing and evaporation of the ice inbetween the platelets of clay under vacuum. During this process, the volume of the system does not change alot, the end product is a dry framework of the clay materials in which clay platelets may keep discretely distributed or delaminated. The product clay can be crushed into granules and sieved to obtain the preferred size of clay powders.

Figure 2:
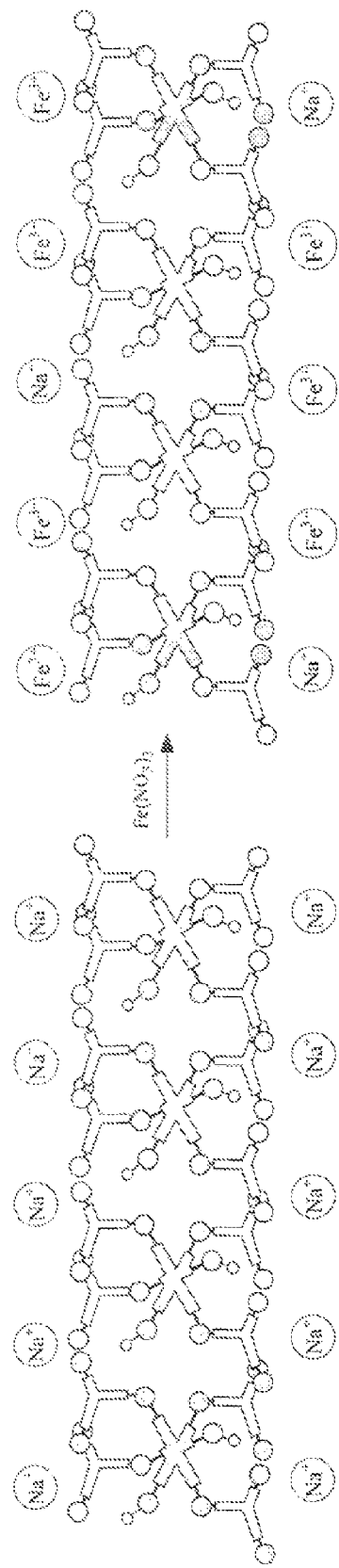
FIG. 2 illustrates a schematic of iron ion substitution on clay.

To control the density of CVD growth CNTs on clay, the concentration of $Fe(NO_3)_3$ mixed with the clay in solution is required to optimize. A microfluidizing machine, which produces high shear force, may be used to exfoliate the clay platelets in solvent and help ion exchanging between Na$^+$ and $Fe^{3+}$. After the ion exchange, the $Fe^{3+}$ is intercalated into the platelets. The ion exchange is depicted in FIG. 2. After the ion exchange the samples will be freeze dried. Freeze-drying can increase the surface area and pore size. When freeze dried, the clay product contains platelets which are oriented edge-to-edge and edge-to-face, thereby increasing the volume by forming macropores. The increased porosity leads to desirable catalytic properties for CVD growth of carbon nanotubes.

Figure 3:
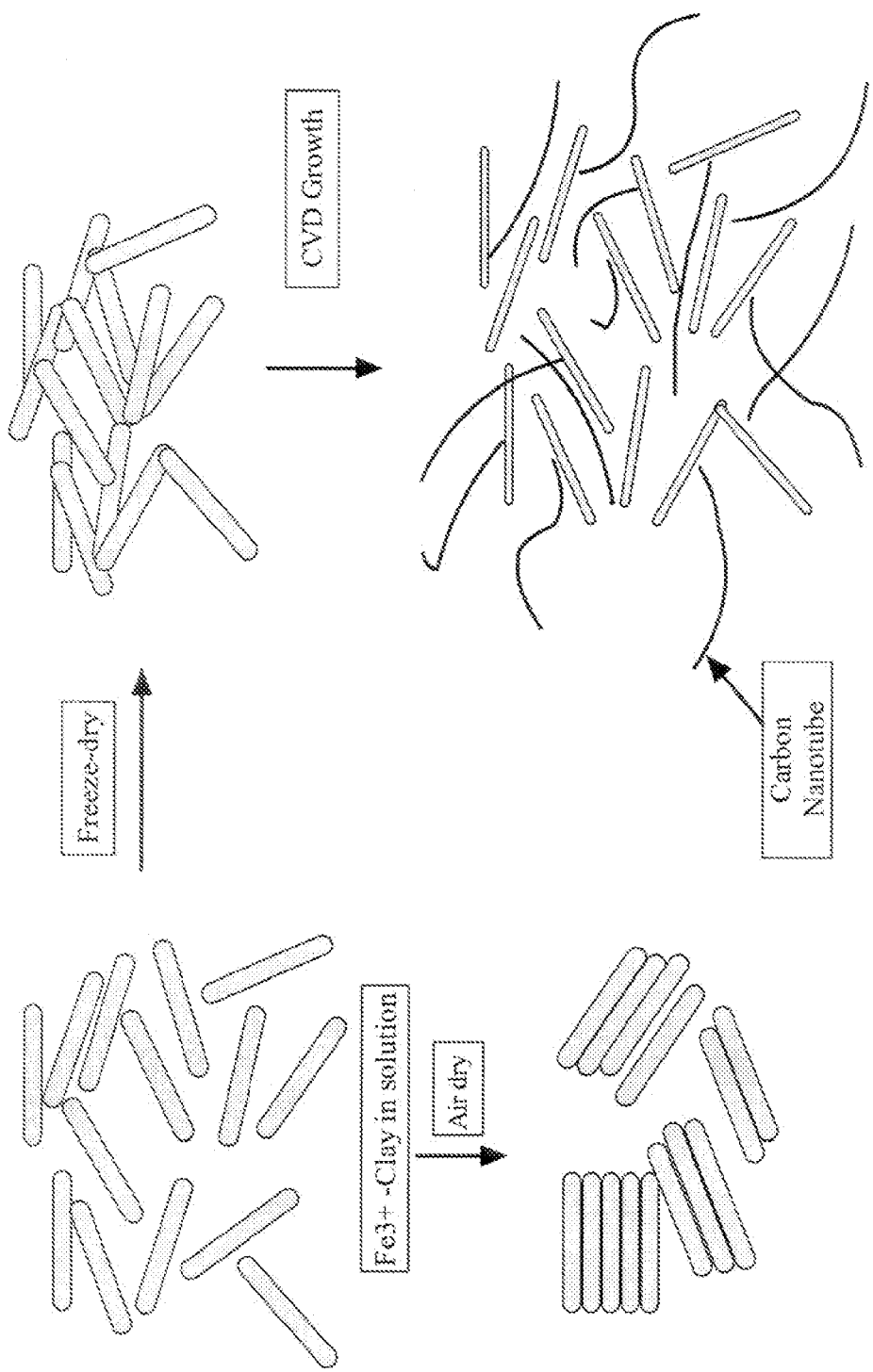
FIG. 3 illustrates growth of a three dimensional CNT/clay hybrid nanofiller where the clays assist in exfoliation of the carbon nanotubes, and the CNTs assist in exfoliation of the platelets of clay.

FIG. 3 illustrates comparison of growth of a 3D CNT/Clay hybrid nanofiller using air dry and freeze dry methods. Clays help exfoliate the carbon nanotubes and conversely, CNTs help exfoliate the platelets of clay, CNTs extend from stable clay surface for maximum interaction with polymer.

EXAMPLE 1

Grow Individually Distributed Carbon Nanotubes on Delaminated Clay Platelets $Fe(NO_3)_3$ and clay are dissolved in 25% ethanol in water. Concentrations of $Fe(NO_3)_3$ ranging from 0.5 mg/ml to 50 mg/ml may be used. The clay is then filtered and washed to remove any residual iron nitrate. The resulting clay is then freeze-dried to obtain a rigid Fe-clay frame structure. The Fe-clay frame structure may be crushed to form a powder and sieved (400 mesh) to remove any large particulate matter. Other transition metals such as cobalt and nickel may also be employed to make clay-supporting catalysts for growing carbon nanotubes. CNTs are grown on the derivatized clay.

Figure 4:
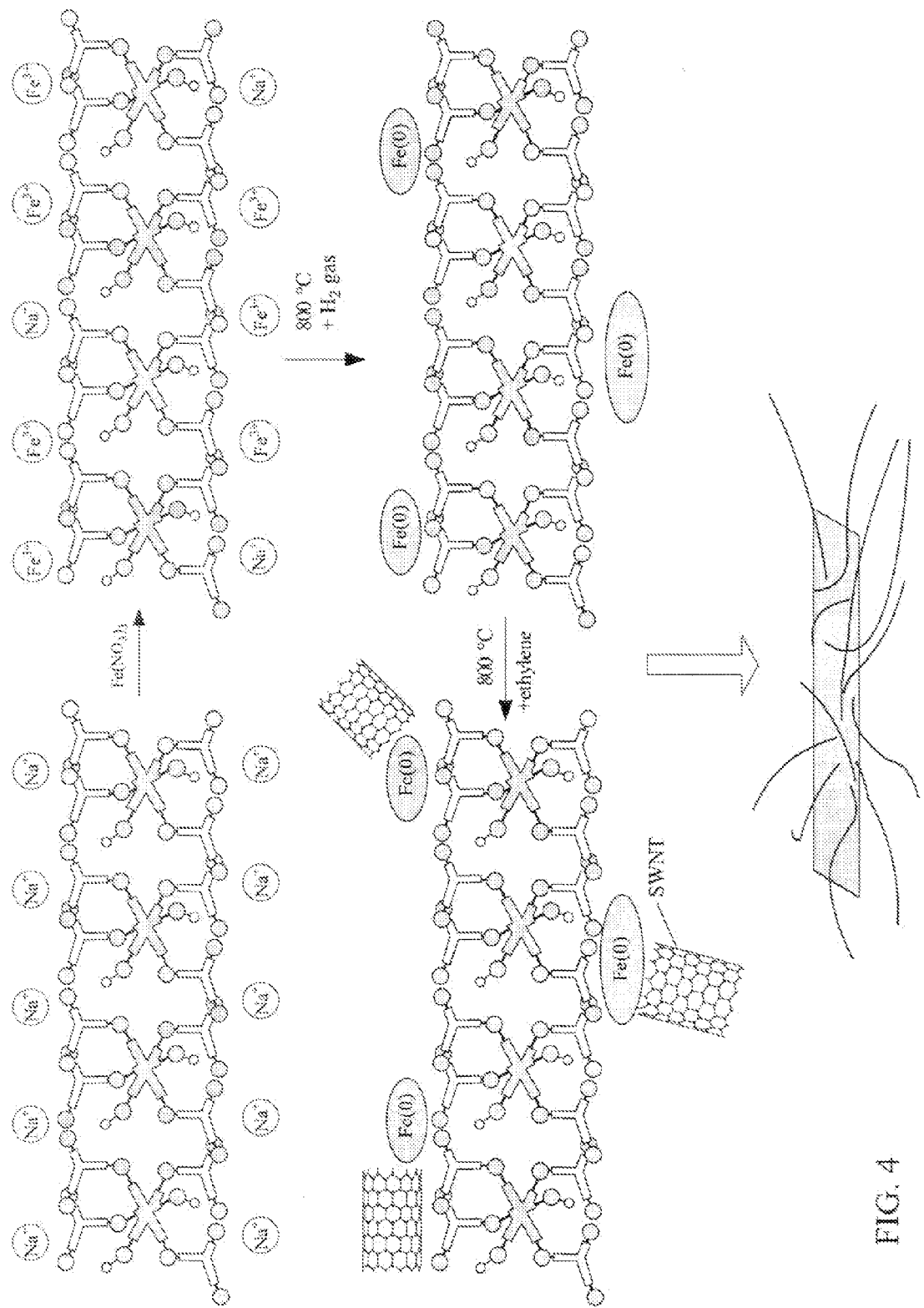
FIG. 4 illustrates a schematic diagram to single-wall carrion nanotube growth on clay platelets.

The process steps are outlined in FIG. 4. The Fe cations are situated on the clay using an ion exchange. The iron serves as the catalyst for CNT growth. The first step in catalytic growth is to convert the Fe ions to metallic Fe. This will be done by heating the clay in an atmosphere of argon and hydrogen. The argon displaces all oxygen to prevent oxidation of the iron. The hydrogen reduces the $Fe^{+3}$ to $Fe^{(0)}$. It is well known that at high temperature in a reducing atmosphere, hydrocarbon gases diffuse into iron catalyst particles. Inside these particles, the gas is catalytically cracked to separate the hydrogen from the carbon. The hydrogen boils off as a gas and the carbon precipitates out inside the metal particles. Given sufficient energy the carbon reorganizes into carbon nanotubes. This transition temperature is about 800° C. The diameter of the carbon nanotubes will be equal to the size of the metal catalyst particle. In the case of the clay nanofiller, the internal spacing limits the size to approximately 2 nm. At this diameter only SWNTs exist.

The freeze-dried nanoclays have 98% air and 2% clay material due to their anisotropic, hollow structure and extremely low density. Based upon this structure, the growth may be accomplished using a fluidized bed reactor to ensure equal and complete CNT growth on the clay substrates. The reactor may comprise a tube furnace turned on its side. There is it quartz tube containing a glass frit. The glass fit can be installed at the level of the hot zone in the furnace. Flow gas enters from the bottom. The clay is added from the top. The clay floats on top of the glass fit due to the gas flow. Mass flow controllers can precisely deliver the gas from external cylinders.

Referring again to FIG. 4, conditions for growth of SWNTs involves a thermal anneal at 800° C. for 45 minutes in an Ar/H mixture (800 sccm and 200 sccm, respectively). The growth of the CNTs occurs during a 20 minute delivery of ethylene at 15 sccm. After the growth period is over the ethylene and hydrogen is turned off and the oven and internal samples are allowed to cool to room temperature under an argon purge. The advantage of this growth technique is that it results in the production of high purity CNTs. There is very little amorphous carbon generated and therefore no need for any purification steps. There is also very little catalyst introduced into the polymer matrix.

Upon completion of the growth, the CNTs can be characterized by X-Ray Diffraction (XRD) to determine the gallery gap of the clay layers and how well the clay galleries are swelled and thus exfoliated by CNTs. SEM and TEM can also be employed to investigate morphologies or the 2-D nanostructures. The highly individualized SWNTs with a diameter of approximately 2.5-3 nm and a length of 3-5 μm are obtained. The CNTs are individual and highly dispersed on the surface. Given the small dimensions of the clays, these SWNTs will grow to a length that hangs off the side of the clay thus maximizing the interaction with a host resin.

An optimal loading is having CNTs on the surface but not so much that the overall structure of the clay is changed. The expected loading density is approximately 1-5 CNTs/$\mu m^2$. At this density, approximately 10 CNTs will be attached to each clay particle. The ethylene concentration and growth time can be changed until the SWNTs meet the specifications.

EXAMPLE 2

Three-D structures Formed from Functionalized CNTs and Functionalized Clay by Covalent Bonding This process is to chemically bond CNTs to clay platelets to make a hybrid CNT-Clay nanofiller. Clay montmorillonite (MMT) has a high cation exchange ratio that allows adding a large amount of organic functional groups for various polymer matrices. Amino acids, such as $H_2N(CH_2)_5$—COOH, may be used to attach relatively loan carbon chains terminated with carboxylic group by replacing Na+. Any amino acids with long carbon chain may be chosen to optimize the gap of clay galleries so that the chemically reactions may easily be carried out between functionalized groups (—$NH_2$) on carbon nanotubes and carboxylic groups on clay platelets.

Figure 5:
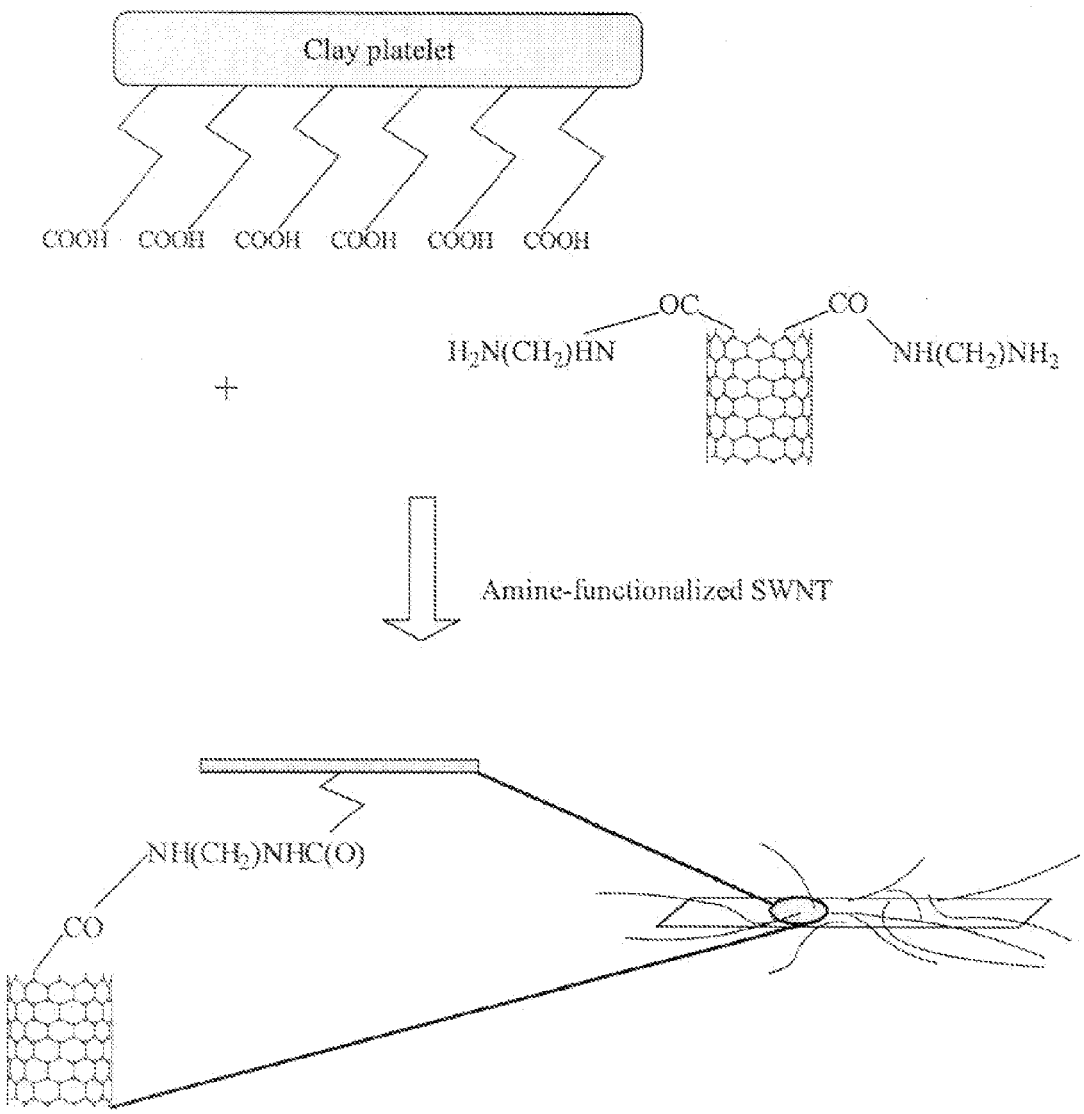
FIG. 5 illustrates carbon nanotubes and clay platelets chemically bonded together in a solution.

Referring to FIG. 5, CNTs and clay platelets are chemically bonded together with a well-controlled ratio of carbon nanotubes and clay to ensure no CNTs aggregate again to bundles due to too much CNTs in solution. The process begins by derivitizing carboxylic-acid groups on the clay platelet surface. Next, CNTs that are derivatized with an amine group are source purified. The process next couples the acid group and the amine to form a covalent amide linkage, between the clay and CNTs. The clay platelets and functionalized CNTs can be well exfoliated in solution by sonication, microfluidizer, and homogenizer. To ensure that large scale cross linking does not occur between the clay and the CNT, the reaction will occur during stirring while dispersed carbon nanotubes in solvent are slowly titrating in clay solution. These excess tubes may also be collected through chemical extraction techniques taking advantage of the differential solubility of the clay and CNTs in aqueous vs. organic solvents.

The clay may also be functionalized with carboxylic acid terminated organic silane coupling agent such as carboxypropyl triethyl silane. The silane end group will bond to clay leaving the carboxylic acid end group available for further reactions with amine terminated carbon nanotubes. The resulting mixture is clay platelets that are covalently bonded to carbon nanotubes.

Not all the functionalized chemical groups on clay platelets and carbon nanotubes are involved in the reaction to form amide linkage between CNTs and clay platelets. The rest of functionalized groups will be chemically bonded to polymer matrix to strong interaction between this hybrid nanofiller and polymer chains, and therefore producing hilly enhanced mechanical properties of polymer nanocomposites.

In summary, embodiments disclose a new hybrid CNT/Clay nanofiller for high-strength composites. This hybrid nanofiller has a greater load transfer capabilities compared with CNT only or clay only. Pseudo-2D structure of nanofiller defines load transfer for different mechanical properties. One-dimensional structure of CNTs enhances Tensile strength. Two-dimensional structure of clays enhances out-of plane strength and impact resistance. Combined CNT-Clay nanofiller enhances all classes of mechanical strength, Direct growth and direct attachment of CNTs to clay eliminates defect sites on CNTs caused by chemical functionalization. No defect sites yields stronger composite materials. Highly dispersed, individually distributed carbon nanotubes may be grown by CVD method on delaminated clay platelets to make hybrid nanofiller for polymeric composites. The CNTs are SWNT or MWNT. The density of CNTs grown on the clay may be controlled by growth conditions. Lower density means greater interaction with host matrix. The CNTs lie fiat on the clay surface for maximum surface area interaction. This creates strong adhesion between the CNTs and clay. Transition metal (Fe, Co, Ni) ion exchange may be used to make a clay-supported catalyst for the growth of carbon nanotubes (single wall or double wall or multi wall). Freeze-drying is employed to prepare high surface-area clay powders containing delaminated clay platelets. Highly dispersed, individually distributed carbon nanotubes may be covalently bonded to clay platelets. CNTs with —$NH_2$ groups and clay platelets with —COOH group may be chemically bonded in solution to make clay-CNT nano filler. The density of CNTs grown on the clay may be controlled by the stoichiometry of CNTs to clay. Unused bonding sites may be tailored for maximum interaction with host matrix.

Zhang et al. (*Advanced Materials* 2006 18, 73-77) demonstrates CVD growth of CNTs on MMT clays using ion-exchange of Fe. There are several important differences between our work and theirs. First, they must convert the $Fe^{3+}$ to $Fe_2O_3$ using a calcinations step. They also grow only multi-walled CNTs (MWNTs) and have large amounts of entanglement. The electron microscopy images show that the MWNTs grow up from the surface. This defines a very limited interaction of the MWNT with the clay surface. The authors indicate a decrease in the ElongatiOn to Breakage(%) and mention that the sample is more brittle. The orthogonal CNT/clay interface would contribute to this property by creating a defect site as the CNTs detach. from the clay.

In contrast, the present invention primarily grows CNTs, which will lay flat on the surface maximizing the surface area and interface strength. This will eliminate the defect sites that lead to brittleness. Conditions will also limit the entanglement and density of the SWNTs. This decreased density will allow for more interaction and intercalation of the nano-filler and polymer chains leading to greater strength.

When freeze dried, the clay product contains platelets which are oriented edge-to-edge and edge-to-face, thereby increasing the volume by forming macropores. The increased porosity leads to desirablecatalytioproperties for CVD growth of carbon nanotubes. There will be a greater uniformity and greater control of the CNT growth. For the approach that chemically reaction occurs between clay terminated with —COOH and carbon nanotubes with —$NH_2$ group to form a amide linkage, not all the functionalized chemical groups on clay platelets and carbon nanotubes are involved in the reaction. The rest of functionalized groups will chemically bonded to polymer matrix to strong interaction between this hybrid nanofiller and polymer chains, and therefore producing fully enhanced mechanical properties of polymer nanocomposites. Further functionalizing'hybrid nanofiller is possible because clay can be easily ion-exchanged and also silane coupling agent are also easily attached to clay for producing strong interaction between nanofiller and polymer matrices. The growth conditions will yield SWNTs on.the surface of the clays. The growth conditions have a greater. control over the density and size .of the CNTs. The growth conditions lead to highly dispersed CNTs. Individual CNTs are much stronger than bundled or aggregated CNTs. The growth conditions will allow the SWNTs to lie flat on the surface maximizing interaction of the SWNT and clays. Direct growth or direct attachment eliminates defect sites on CNTs. This leads to greater load transfer and higher strength materials. Clays can be further functionalized to interact with host polymer in composite. CNTs can be further functionalized to interact with host polymer in composite. CNTs and Clays each contribute to load transfer to enhance different mechanical strengths. The combination of the two into one nano-tiller composite enhances all mechanical properties from Tensile to out-of-plane measurements.

Figure 6:
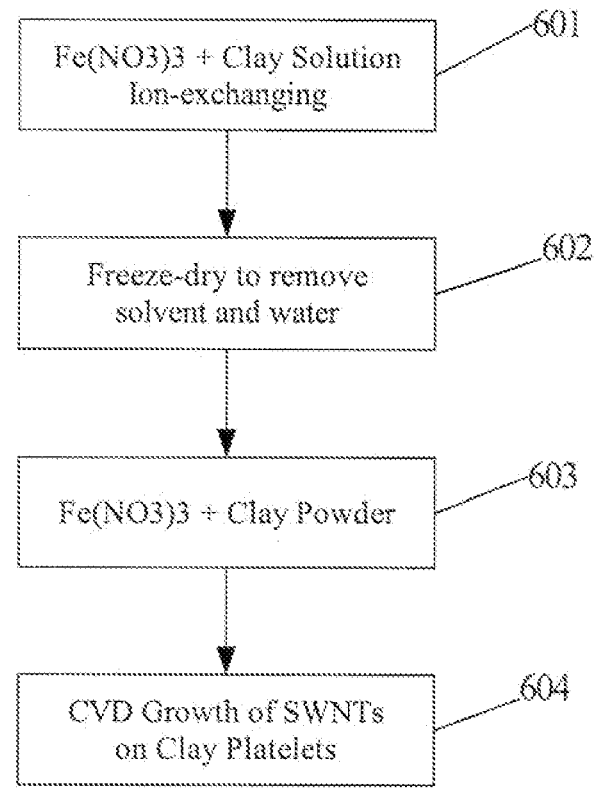
FIG. 6 illustrates a process configured in accordance with embodiments of the present invention.

FIG. 6 illustrates a how diagram for growing single-wall carbon nanotubes on MMP clay platelets. In step 601, the ion exchanging as illustrated in FIG. 2 is performed. In step 602, that solution is then freeze-dried to remove the solvent and water, resulting in step 603 with the clay platelets dispersed as shown in the above figures. In step 604, single-wall carbon nanotubes are then grown using a CVD process on the clay platelets.

The invention claimed is:

1. A method for growing carbon nanotubes on clay platelets comprising:
   mixing clay with $Fe(NO_3)_3$ in a solution;
   freeze drying the solution thereby increasing surface area of the clay platelets; and
   growing carbon nanotuhes on the freeze-dried clay platelets.

2. The method as recited in claim 1, wherein the freeze-drying process removes solvent and water from the solution.

3. The method as recited in claim 1 wherein the carbon nanotuhes are grown on the clay platelets using a chemical vapor deposition process.

4. The method as recited in claim 1, wherein the carbon nanotuhes are single-wall carbon nanotubes.

5. The method as recited in claim 1, wherein the carbon nanotubes are multi-wall carbon nanotuhes.

6. The method as recited in claim 1, wherein the mixing step promotes an ion exchange between $Na^+$ and $Fe^{3+}$.

7. The method as recited in claim 1, wherein the solution comprises 25% ethanol in water.

8. The method as recited in claim 1, wherein the freeze drying of the solution further separates the clay platelets to increase the surface area.

9. The method as recited in claim 1, wherein the freeze drying of the solution orients the clay platelets edge-to-edge and edge-to-face with each other thereby forming pores.

10. The method as recited in claim 1, wherein the mixing the clay with the $Fe(NO_3)_3$ in the solution is performed with a machine producing a high shear force mixing of the solution.

11. A method for growing carbon nanotubes on clay platelets comprising:
    mixing clay with metal salts or compounds in a solution;
    freeze drying the solution thereby increasing surface area of the clay platelets; and
    growing carbon nanotubes on the freeze-dried clay platelets.

12. The method as recited in claim 11, wherein after freeze-drying, the clay platelets are discretely distributed or delaminated.

13. The method as recited in claim 11, wherein the carbon nanotubes are grown on the clay platelets using a chemical vapor deposition process.

14. The method as recited in claim 11, wherein the carbon nanotubes are single-wall carbon nanotubes.

15. The method as recited in claim 11, wherein the carbon nanotubes are multi-wall carbon nanotubes.

16. The method as recited in claim 11, wherein the mixing step promotes an ion exchange between $Na^+$ and $Ni^{3+}$.

17. The method as recited in claim 11, wherein the freeze drying of the solution further separates the clay platelets to increase the surface area.

18. The method as recited in claim 11, wherein the freeze drying of the solution orients the clay platelets edge-to-edge and edge-to-face with each other thereby forming pores.

19. The method as recited in claim 11, wherein the mixing the clay with the metal salts or compounds in the solution is performed with a machine producing a high shear force mixing of the solution.

20. A method for growing carbon nanotubes on clay platelets comprising:
    mixing clay with $Fe(NO_3)_3$ in a solution;
    freeze drying the solution thereby increasing a surface area of the clay platelets; and
    growing carbon nanotubes on the freeze-dried clay platelets, wherein the mixing step promotes an ion exchange between $Na^+$ and $Co^{2+}$.

21. The method as recited in claim 20, wherein the mixing the clay with the $Fe(NO_3)_3$ in the solution is performed with a machine producing a high shear force mixing of the solution.

* * * * *